(12) United States Patent
Adams

(10) Patent No.: US 6,349,514 B1
(45) Date of Patent: Feb. 26, 2002

(54) GROUND STAKE

(75) Inventor: William E. Adams, Harmony, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 09/496,815

(22) Filed: Feb. 2, 2000

(51) Int. Cl.[7] ............... F16B 15/08; A01G 1/00
(52) U.S. Cl. ............... 52/155; 52/103; 52/156; 52/162; 52/163; 52/4; 135/118; 411/455; 405/244; 405/232
(58) Field of Search ............... 52/103, 155, 156, 52/162, 163, 4, 5, 417, 419; 135/118, 119, 115; 405/244, 232; 411/455

(56) References Cited

U.S. PATENT DOCUMENTS

| 484,998 A | 10/1892 | Comstock |
| 2,777,454 A | 1/1957 | Kramer ............... 135/5 |
| 2,901,789 A | 9/1959 | Frank ............... 20/99 |
| 3,065,947 A | 11/1962 | Thompson ............... 248/361 |
| 3,325,135 A | 6/1967 | Clarke ............... 248/361 |
| 3,635,232 A | 1/1972 | Rotheiser ............... 135/15 PE |
| 4,185,424 A * | 1/1980 | Streit ............... 52/103 |
| 4,738,060 A * | 4/1988 | Marthaler et al. ............... 52/103 |
| 4,819,904 A | 4/1989 | Shpigel et al. ............... 248/545 |
| 4,846,655 A * | 7/1989 | Gulley ............... 411/453 |
| 5,245,715 A | 9/1993 | Dinkins ............... 5/417 |
| 5,396,743 A | 3/1995 | Bellette ............... 52/154 |
| 5,524,309 A * | 6/1996 | La Barbera ............... 5/658 |
| 5,564,232 A | 10/1996 | Callaway ............... 5/4 |
| 5,608,994 A | 3/1997 | Carter ............... 52/156 |
| 5,832,672 A | 11/1998 | Griffiths et al. ............... 52/4 |
| 5,890,842 A * | 4/1999 | Dahill ............... 405/244 |

* cited by examiner

Primary Examiner—Beth A. Stephan
Assistant Examiner—Patrick J. Chavez

(57) ABSTRACT

A ground stake is disclosed having a plurality of blades extending outwardly from a longitudinal axis. The blades are connected along the length of the axis by at least one conical rib to promote retention of the stake within the ground.

22 Claims, 2 Drawing Sheets

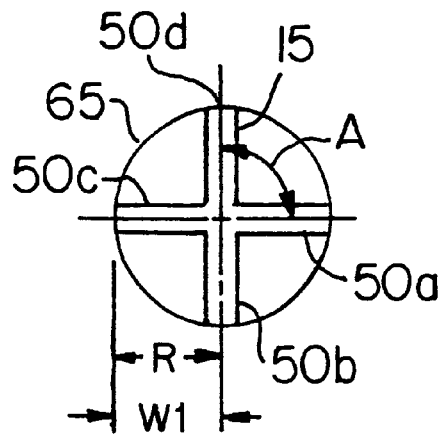
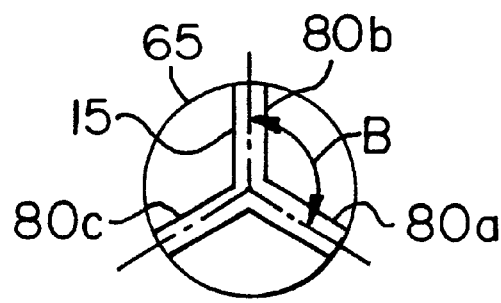
FIG. 3
FIG. 4
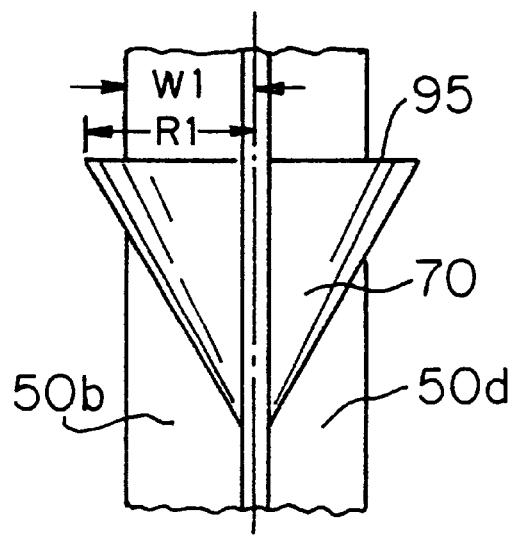
FIG. 5

GROUND STAKE

BACKGROUND OF THE INVENTION

1. Field of the Invention

This invention relates to a ground stake and, more particularly, to a ground stake configured to be more firmly secured within the ground.

2. Background Art

Ground stakes have applications ranging from securing a tarpaulin to the ground to acting as an anchor for guide wires to support, for example, a tarp or a tent. The stake must penetrate the ground relatively easily but, on the other hand, provide a secure anchor and offer significant resistance to forces urging the stake from the ground.

U.S. Pat. No. 5,564,232 entitled "Tarpaulin Holddown Device" to Callaway discloses a stake having a plurality of adjacent conical segments along the length of the stake shaft wherein each conical segment has an upwardly facing shoulder to resist removal of the stake from the ground. However, the surface area provided by these upwardly facing shoulders is relatively small. Additionally, the series of adjacent conical sections in this design requires a relatively large amount of material, such as plastic, compared with other stakes.

Other known ground stakes are shown and discussed in U.S. Pat. Nos. 484,998 to Comstock; U.S. Pat. No. 2,777,454 to Kramer; U.S. Pat. No. 2,901,789 to Frank; U.S. Pat. No. 3,065,947 to Thompson; U.S. Pat. No. 3,325,135 to Clarke; U.S. Pat. No. 3,635,232 to Rotheiser; U.S. Pat. No. 4,185,424 to Streit; U.S. Pat. No. 4,819,904 to Shpigel et al.; U.S. Pat. No. 5,245,715 to Dinkins; U.S. Pat. No. 5,396,743 to Bellette; U.S. Pat. No. 5,608,994 to Carter; U.S. Pat. No. 5,832,672 to Griffiths et al.; and U.S. Pat. No. 5,890,842 to Dahill A design is desired whereby the retention surface of segments on the shaft has a greater surface area and, furthermore, where less material is required to construct such an arrangement.

Still other objects of the present invention will become apparent to those of ordinary skill in the art upon reading and understanding the following detailed description.

BRIEF SUMMARY OF THE INVENTION

The invention is directed to a stake having a top end and a bottom end and comprised of an engaging member at the top end of the stake and a shaft extending from the engaging member. The shaft has a longitudinal axis, a core extending along the axis, a plurality of blades extending outwardly from the axis, wherein each blade has two opposing surfaces, and at least one conical rib connecting the blades, wherein the largest radius of the conical rib is toward the top end of the stake.

BRIEF DESCRIPTION OF THE DRAWINGS

FIG. 3 is a cross-sectional view of the stake along lines III—III in FIG. 2;

FIG. 4 is a cross-sectional view similar to FIG. 3, but representing a second embodiment having three blades; and FIG. 5 is a side view of an alternative embodiment of the encircled section on FIG. 2 labeled V.

DETAILED DESCRIPTION OF THE INVENTION

Figure 1:
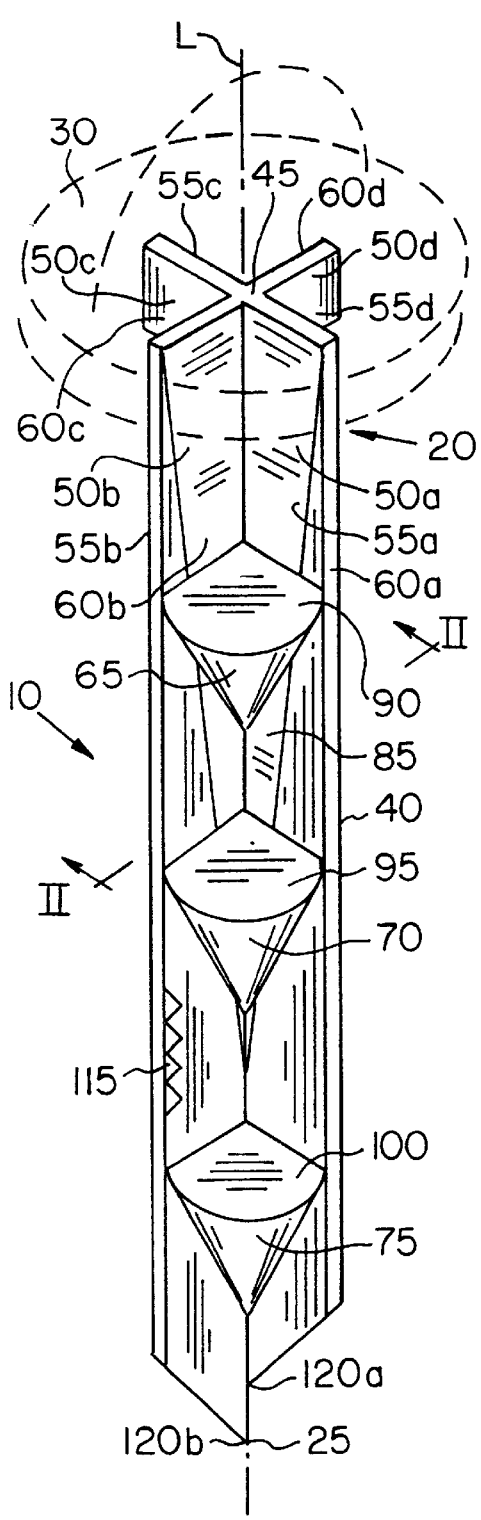
FIG. 1 is a perspective view of a ground stake in accordance with the subject invention.
Figure 2:
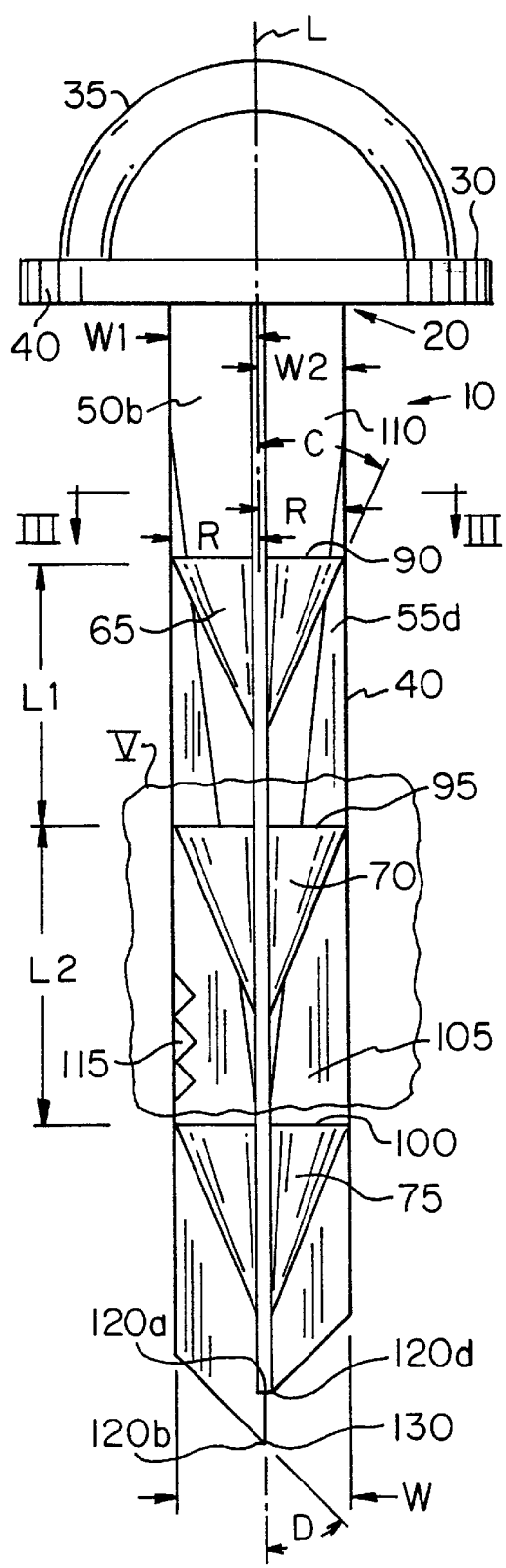
FIG. 2 is a side view of the stake illustrated in FIG. 1 along lines II—II in FIG. 1.

FIGS. 1 and 2 illustrate a perspective and side view of the subject invention in accordance with the first embodiment and will be discussed simultaneously.

A ground stake 10 has a shaft 15 with a top end 20 and a bottom end 25. An engaging member 30 may be comprised of a ring-shaped retainer 35 mounted upon a base 40 which is integral with the top end 20 of the shaft 15. The shaft 15 has a longitudinal axis L with a core 45 extending along the axis L. A plurality of blades 50a–d extends outwardly from the axis L. Each blade 50a–d has two opposing surfaces 55a–d and 60a–d, respectively. At least one conical rib 65 connects the blades 50a–d. The conical rib 65 is oriented such that the rib portion having the largest radius R is oriented toward the top end 20 of the shaft 15. As illustrated in FIGS. 1 and 2, the stake may have a plurality of ribs 65, 70, 75.

FIG. 3 shows a cross section of the stake 10 along lines III—III in FIG. 2. The shaft 15 may have four blades 50a–d and each of these blades may define with an adjacent blade an angle A which may have a value of 90 degrees. FIG. 4 illustrates an alternative embodiment whereby the shaft 15 is comprised of three outwardly extending blades 80a–c. Adjacent blades form with one another an angle B which may have a value of 120 degrees.

Returning to FIGS. 1 and 2, the opposing surfaces 55a–d and 60a–d on each blade 50a–d may be planar and each planar surface directly intersects with the planar surface of an adjacent blade. As an example, planar surface 55a directly intersects with planar surface 60b to form a relatively deep pocket 85 between the blades 50a and 50b.

The following discussion will be directed to rib 65 with the understanding that the same details may apply equally to ribs 70 and 75.

Rib 65 may have a planar top surface 90. This planar top surface 90 in conjunction with the deep pocket 85 created by the intersection of the blades provides a relatively large surface area which will be engaged by the ground soil to retain the stake within the ground. Additionally, the planar top surface 90 may be perpendicular to the longitudinal axis L, thereby providing maximum resistance to forces tending to urge the stake from the ground. It should be appreciated that this top planar surface 90 in conjunction with the relatively deep cavity 85 provided by the manner in which the blades 50a, 50b, 50c, 50d intersect with one another permits the planar top surface to have a maximum area.

As illustrated in FIG. 2, conical rib 65 forms a cone angle C with the longitudinal axis L. This cone angle C may have a value of between about 30 to about 60 degrees with a preferred angle of about 30 degrees. Furthermore, a width W of the shaft 15 may be about one-half inch. Under these circumstances, each rib 65, 70, 75 may be longitudinally spaced from an adjacent rib by a distance L1, L2 of between one-half to one inch measured from planar top surfaces 90, 95, 100 at each rib 65, 70, 75. It is important that the ribs 65, 70, 75 be sufficiently spaced from one another such that the planar top surfaces 90, 95, 100 are fully exposed to capture and retain soil that is urged against them when the stake is inserted within the ground.

While the top surfaces 90, 95, 100 are illustrated and discussed as being planar, they may, in the alternative, be concave. A concave top surface may capture and retain soil more effectively than a planar top surface.

With the understanding that the soil density increases with depth in the ground, in one embodiment of the subject invention, the distance L1, L2 between adjacent ribs may decrease as the ribs approach the bottom end 25 of the shaft 15. As an example, the value of L1 may be one inch while the value of L2 may be three-fourths of an inch.

Additionally, soil freezes from the ground surface downward. The ribs 65, 70, 75, with their enlarged planar surfaces 90, 95, 100, are therefore urged further into the ground by soil that may freeze around them.

While only three ribs 65, 70, 75 have been illustrated, it should be understood that the present invention may have fewer or more ribs.

Directing attention to FIG. 2, blades 50b and 50d will be discussed with the understanding that the same discussion applies to remaining blades 50a and 50c. Each blade 50b, 50d extends outwardly from the longitudinal axis L a uniform width W1, W2. The largest radius R of each rib 65, 70, 75 as illustrated by rib 65 is less than or equal to the uniform width W1, W2 of blades 50b, 50d. This arrangement is further illustrated in the cross-sectional view of FIG. 3 which illustrates that the rib 65 does not extend beyond the width of any ribs 50a–d.

To further maximize the planar top surfaces on a given rib, as illustrated in FIG. 5, the largest radius R1 of rib 95 or any other rib may be greater than the uniform width W1, W2 of the blades 50b, 50d such that the rib 70 overhangs the blades. Under these circumstances, the largest radius R1 of each rib may be up to 1.5 times the width W2 of a blade.

In general, the texture of the opposing surfaces 55a–d and of the blades 50a–d is glossy. However, to improve the retention capability of the shaft 15, it is possible to provide a rougher surface on a portion of or all of the opposing surfaces 55a–d and 60a–d. Directing attention to FIG. 2, at least one blade surface 50d may have a rough texture indicated by reference numeral 105 at the bottom end 25 of the shaft 15 and the surface may transition to a smooth texture surface 110 at the top end 20 of the shaft 15.

To provide additional resistance to removal of the stake 10 from the ground, it is possible to provide at least one opposing surface 55b with an imprint of an irregular pattern 115 such as the serrated pattern illustrated in FIGS. 1 and 2.

The proper orientation of the stake 10 within the ground is often times determined by the angle of the initial penetration within the ground. Therefore, it may be desirable to make such initial penetration as easy as possible.

Directing attention to FIGS. 1 and 2, ends 120a, 120b, 120d of blades 50a, 50b, 50d toward the bottom end 25 of the shaft 15 are tapered inwardly toward the axis L and downwardly to provide a pointed end for promoting penetration of the shaft 15. To provide a smaller point, it is possible to extend one blade 50b farther along the longitudinal axis L toward the bottom end 25 and the remaining blades 50a, 50d are extended as illustrated in FIGS. 1 and 2.

Additionally, to promote penetration of the shaft 15, the blades at ends 120a–d may form an angle D with the longitudinal axis L having a value of between 30 and 60 degrees.

In addition to those already mentioned, the present invention offers a number of other advantages. The conical ribs make easier inserting the stake into the ground while simultaneously adding stiffness to the stake to better resist bending. Furthermore, the stiffness imparted by the conical ribs may permit the blades of the stake to be thinner thereby requiring less material in the fabrication of the stake. The conical shape of the ribs also may tend to reduce tearing of a tarp or sheet of plastic, such as a mulch cover, when the stake is used to penetrate the material of a tarp to secure the tarp to the ground. Furthermore, the roughened texture of the stake blade surface is more prevalent at the bottom of the stake. Since the ground pressure against the stake is greater in deeper soil, this acts to better retain the stake in the ground. Finally, the relatively thin blade width of the stake provides a greater surface area at the top of the conical rib. This increased surface area, when inserted in the ground, captures a greater amount of soil and thereby acts to more fully retain the stake within the ground.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. A stake having a top end and a bottom end and comprised of:
   a) an engaging member at the top end of the stake;
   b) a shaft, extending from the engaging member, having
      i) a longitudinal axis;
      ii) a core extending along the axis;
      iii) a plurality of blades extending outwardly from the axis, wherein each blade has two opposing planar surfaces and each planar surface directly intersects with the planar surface of an adjacent blade; and
      iv) at least one conical rib connecting the blades, wherein the largest radius of the conical rib is toward the top end of the stake.

2. The stake according to claim 1 wherein the shaft has three blades.

3. The stake according to claim 2 wherein the blades are spaced apart from one another at about 120 degrees.

4. The stake according to claim 1 wherein the shaft has four blades spaced apart from one another at about 90 degrees.

5. The stake according to claim 1 wherein each rib has a planar top surface.

6. The stake according to claim 5 wherein each planar top surface is substantially perpendicular to the longitudinal axis.

7. The stake according to claim 1 wherein each rib has a concave top surface.

8. The stake according to claim 1 wherein each conical rib forms a cone angle with the longitudinal axis of between about 30 degrees and about 60 degrees.

9. The stake according to claim 1 wherein each rib is longitudinally spaced from an adjacent rib by a distance between about 0.5 inch and about 1 inch.

10. The stake according to claim 9 wherein the distance between adjacent ribs decreases as the ribs approach the bottom end of the shaft.

11. The stake according to claim 1 wherein each blade extends outwardly from the longitudinal axis a uniform distance to define a uniform width.

12. The stake according to claim 11 wherein the largest radius of each rib is less than or equal to the uniform width of the blades.

13. The stake according to claim 11 wherein the largest radius of each rib is greater than the uniform width of the blades such that the ribs overhang the blades.

14. The stake according to claim 13 wherein the largest radius of each rib is up to 1.5 times the width of the blades.

15. The stake according to claim 1 wherein the texture of at least one blade surface is defined by an area with a first surface roughness at the bottom of the shaft and by an area with a second surface roughness at the top of the shaft, wherein the area with the first surface roughness diminishes and the area with the second surface roughness increases from the bottom end of the shaft to the top end of the shaft.

16. The stake according to claim 1 wherein on at least one blade surface there is imprinted a serrated pattern.

17. The stake according to claim 1 wherein the ends of each blade toward the bottom end of the shaft are tapered inwardly toward the axis and downwardly to provide a pointed end for promoting penetration of the stake.

18. The stake according to claim 1 wherein at least one blade extends farther in the longitudinal direction toward the bottom end than do the remaining blades.

19. A stake having a top end and a bottom end and comprised of:
   a) an engaging member at the top end of the stake; and
   b) a shaft, extending from the engaging member, having
      i) a longitudinal axis;
      ii) a core extending along the axis;
      iii) a plurality of blades extending outwardly from the axis, wherein each blade has two opposing planar surfaces and wherein each planar surface intersects directly with the planar surface of an adjacent blade; and
      iv) at least one conical rib connecting the blades, wherein the largest radius of the conical rib is toward the top end of the stake and wherein each rib has a planar top surface perpendicular to the longitudinal axis.

20. A stake having a top end and a bottom end and comprised of:
   a) an engaging member at the top end of the stake;
   b) a shaft, extending from the engaging member, having
      i) a longitudinal axis;
      ii) a core extending along the axis;
      iii) a plurality of blades extending outwardly from the axis, wherein each blade has two opposing surfaces; and
      iv) at least one conical rib connecting the blades, wherein the largest radius of the conical rib is toward the top end of the stake and wherein each rib has a concave top surface.

21. A stake having a top end and a bottom end and comprised of:
   a) an engaging member at the top end of the stake;
   b) a shaft, extending from the engaging member, having
      I) a longitudinal axis;
      I) a core extending along the axis;
      iii) a plurality of blades extending outwardly from the axis, wherein each blade has two opposing planar surfaces and each planar surface directly intersects with the planar surface of an adjacent blade, and wherein on at least one blade surface there is imprinted a serrated pattern; and
      iv) at least one conical rib connecting the blades, wherein the largest radius of the conical rib is toward the top end of the stake.

22. A stake having a top end and a bottom end and comprised of:
   a) an engaging member at the top end of the stake;
   b) a shaft, extending from the engaging member, having
      I) a longitudinal axis;
      I) a core extending along the axis;
      iii) a plurality of blades extending outwardly from the axis, wherein each blade has two opposing planar surfaces and each planar surface directly intersects with the planar surface of an adjacent blade, and wherein at least one blade extends farther in the longitudinal direction toward the bottom end than do the remaining blades; and
      iv) at least one conical rib connecting the blades, wherein the largest radius of the conical rib is toward the top end of the stake.

* * * * *

UNITED STATES PATENT AND TRADEMARK OFFICE
CERTIFICATE OF CORRECTION

PATENT NO.    : 6,349,514 B1
DATED         : February 26, 2002
INVENTOR(S)   : William E. Adams It is certified that error appears in the above-identified patent and that said Letters Patent is hereby corrected as shown below:

Column 6,
Line 10, "I)" should read -- i) --.
Line 11, "I)" should read -- ii) --.
Line 26, "I)" should read -- i) --.
Line 27, "I)" should read -- ii) --.

Signed and Sealed this

Fourth Day of June, 2002

Attest:

Attesting Officer

JAMES E. ROGAN
Director of the United States Patent and Trademark Office